US007689408B2

(12) United States Patent  (10) Patent No.: US 7,689,408 B2
Chen et al.  (45) Date of Patent: Mar. 30, 2010

(54) IDENTIFYING LANGUAGE OF ORIGIN FOR WORDS USING ESTIMATES OF NORMALIZED APPEARANCE FREQUENCY

(75) Inventors: Yi Ning Chen, Beijing (CN); Min Chu, Beijing (CN); Jiali You, Beijing (CN); Frank Kao-Ping Soong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 874 days.

(21) Appl. No.: 11/515,468

(22) Filed: Sep. 1, 2006

(65) Prior Publication Data

US 2008/0059151 A1 Mar. 6, 2008

(51) Int. Cl.
*G06F 17/20* (2006.01)
*G10L 21/00* (2006.01)
(52) U.S. Cl. .............................. 704/8; 704/1; 704/277
(58) Field of Classification Search ...................... 704/1, 704/2, 7, 8, 277
See application file for complete search history.

(56) References Cited

U.S. PATENT DOCUMENTS

| 5,062,143 | A | | 10/1991 | Schmitt ...................... 382/230 |
| 5,418,951 | A | * | 5/1995 | Damashek .................... 707/5 |
| 5,541,836 | A | | 7/1996 | Church et al. ................. 704/7 |
| 6,272,464 | B1 | | 8/2001 | Kiraz et al. ................. 704/257 |
| 6,292,772 | B1 | * | 9/2001 | Kantrowitz .................... 704/9 |
| 6,415,250 | B1 | * | 7/2002 | van den Akker ............... 704/9 |
| 6,615,168 | B1 | * | 9/2003 | Resnik et al. .................. 704/8 |
| 6,704,698 | B1 | * | 3/2004 | Paulsen et al. ................. 704/1 |
| 6,999,915 | B2 | | 2/2006 | Mestre et al. .................. 704/2 |
| 7,191,116 | B2 | * | 3/2007 | Alpha ......................... 704/8 |
| 2003/0191626 | A1 | | 10/2003 | Al-Onaizan et al. ........... 704/8 |
| 2004/0024760 | A1 | | 2/2004 | Toner et al. ................... 707/6 |
| 2004/0153306 | A1 | | 8/2004 | Tanner et al. ................. 704/4 |
| 2006/0047691 | A1 | | 3/2006 | Humphreys et al. ......... 707/102 |
| 2006/0074628 | A1 | * | 4/2006 | Elbaz et al. ................... 704/8 |

OTHER PUBLICATIONS

Juha Hakkinen et al., "N-Gram and Decision Tree Based Language Identification for Written Words" 2002 IEEE p. 335-338.
Silviu Cucerzan et al., "Language Independent Named Entity Recognition Combining Morphological and Contextual Evidence" Department of Computer Science Center for Language and Speech Processing, John Hopkins University, pp. 90-99, 1999.

(Continued)

*Primary Examiner*—Richemond Dorvil
*Assistant Examiner*—Douglas C Godbold
(74) *Attorney, Agent, or Firm*—Joseph R. Kelly; Westman, Champlin & Kelly, P.A.

(57) ABSTRACT

The language of origin of a word or named entity is predicted using estimates of frequency of occurrence of the word or named entity in different languages. In one embodiment, the normalized frequency of occurrence of the word or named entity in a variety of different languages is estimated and the values are used as features in a feature vector which is scored and used to identify language of origin.

11 Claims, 9 Drawing Sheets

OTHER PUBLICATIONS

Pu-Jen Cheng et al. "Translating Unknown Queries with Web Corpora for Cross-Language Information Retrieval" Institute of Information Science, Academia Sinica, Taiwan. SIGIR 04, Jul. 25-29, 2004 pp. 146-153.

Venkatesan Guruswami et al., "Multiclass Learning, Boosting, and Error-Correcting Codes" MIT Laboratory for Computer Science, 11 pages, 1999.

Ariadna Font Llitjos et al., "Knowledge of Language Origin Improves Pronunciation Accuracy of Proper Names", Language Technologies Inst. Caregie Mellon University, 4 pages, 2001.

Alan W. Black et al., "Issues in Building General Letter to Sound Rules" CSRT University of Edinburgh, 4 pages, 1998.

Adam Kilgarriff et al., "Introduction to the Special Issue on the Web as Corpus" 2003 Association for Computational Linguistics, pp. 333-347, 2003.

Pu-Jen Cheng et al., "Creating Multilingual Translation Lexicons with Regional Variations Using Web Corpora" Institute of Information Science, Academia Sinica, Taiwan. 8 pages, 2004.

Fei Huang et al., "Cluster-specific Named Entity Transliteration" Proceedings of Human Language Technology Conference and Conference on Empirical Methods in Natural Language Processing (HLT/EMNLP), pp. 435-442, Vancouver, Oct. 2005.

Tony Vitale, "An Algorithm for High Accuracy Name Pronunciation by Parametric Speech", 1991 Association for Computational Linguistics, pp. 257-276.

Yoav Freund et al., "A Decision-Theoretic Generalization of On-Line Learning and an Application to Boosting", Journal of Computer and System Sciences, 55(1):119-139, 1997. pp. 1-35.

* cited by examiner

IDENTIFYING LANGUAGE OF ORIGIN FOR WORDS USING ESTIMATES OF NORMALIZED APPEARANCE FREQUENCY

BACKGROUND

Many different types of speech related applications, such as speech synthesis (or text-to-speech) and speech recognition, have capabilities for predicting the pronunciations of out-of-vocabulary words. This is normally accomplished using letter-to-sound (LTS) components.

LTS components are commonly used to pronounce personal names, location names, product names, and other such items, often referred to as named entities. The LTS components are commonly used to pronounce named entities, because named entities are often not contained in the vocabulary of the speech related application.

Personal names and other named entities often originate from a wide variety of different languages. Each of these languages often has its own set of pronunciation rules for pronouncing such words. Therefore, the accuracy of the pronunciation generated from a typical English LTS component is normally low for words that originated in another language.

Therefore, identifying the language of origin of a personal name or other word or named entity, without context, is currently being used in an attempt to aid speech synthesis, speech recognition and named entity transliteration. Identifying the language of origin is currently being performed using morphological structure, which has long been considered as the main source of language origin information. However, the error rate associated with current language of origin identifiers is still appreciable.

The discussion above is merely provided for general background information and is not intended to be used as an aid in determining the scope of the claimed subject matter.

SUMMARY

The language of origin of a word or named entity is predicted using estimates of frequency of occurrence of the word or named entity in different languages. In one embodiment, the normalized frequency of occurrence of the word or named entity in a variety of different languages is estimated and the values are used as features in a feature vector which is scored and used to identify language of origin.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
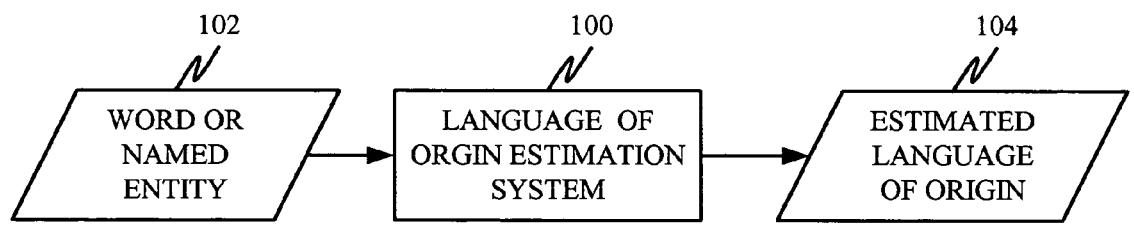
FIG. 1 is a block diagram of a language of origin estimation system.

FIG. 1 is a block diagram of one illustrative language of origin estimation system 100. System 100 receives, as an input, a word or named entity 102. A named entity is, by way of example, a personal name, the name of an organization, a product name, a street name, a building name, or another formal name of a person, location, or item. Language of origin estimation system 100 receives word or named entity 102 and estimates the language of origin 104 for the word or named entity 102 that is input to system 100.

In order to identify the language of origin of input 102, without context, a maximum posterior probability criterion is adopted. With a Bayesian formula, the maximum posterior probability criterion can be written as follows:

$$L^* = \mathrm{argmax}_l \{P(l, W)\} \quad \text{Eq. 1}$$
$$= \mathrm{argmax}_l \left\{ \frac{P(W \mid l)P(l)}{P(W)} \right\}$$
$$= \mathrm{argmax}_l \{P(W \mid l)P(l)\}$$

where, $P(W|l)$ is the probability of a language of origin, given a word and W is a given word, l is the possible language of origin for W, $P(W|l)$ is the probability of the given word W given the possible language of origin l, $P(W)$ is the prior probability of word W and $L^*$ is the decision hypothesis.

Since $P(l)$ is the prior probability of a language, one important aspect of solving Eq. 1 is to estimate $P(W|l)$.

Figure 2:
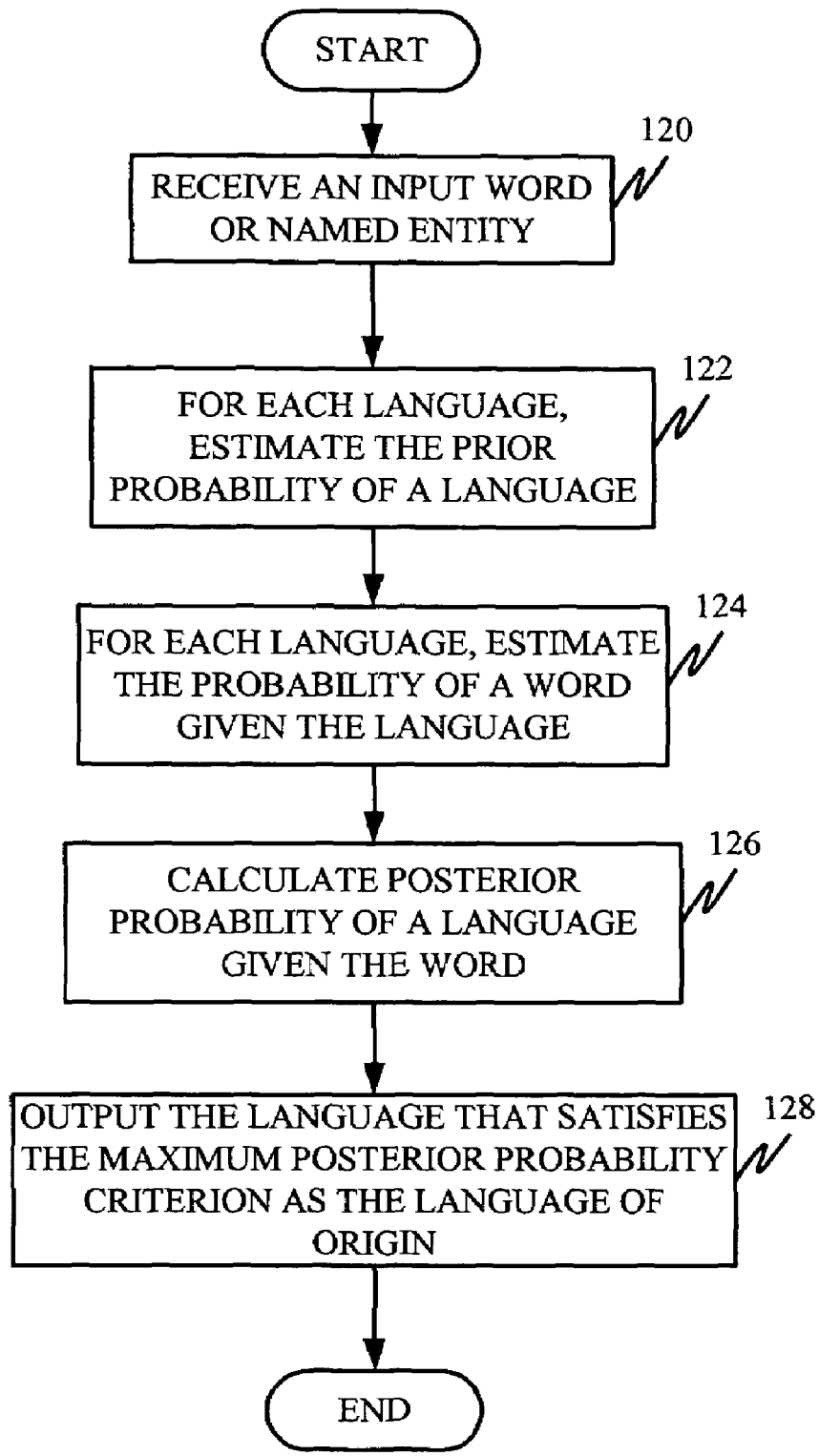
FIG. 2 is a flow diagram illustrating one embodiment of the overall operation of the system shown in FIG. 1.

FIG. 2 is a flow diagram illustrating the operation of system 100 shown in FIG. 1 in identifying the language of origin of the input 102. System 100 first receives the input word or named entity 102. This is indicated by block 120 in FIG. 2.

Then, for each language for which an estimate is being done, system 100 estimates the prior probability of that language. This is indicated by block 122 in FIG. 2 and is represented by $P(l)$ in Eq. 1.

System 100 then estimates, for each language, the probability of a word W given the language. This is indicated by block 124 in FIG. 2 and is represented by $P(W|l)$ in Eq. 1.

System 100 then calculates the posterior probability of a language l given the word W as set out in Eq. 1. This is indicated by block 126 in FIG. 2.

System 100 outputs the language that satisfies the maximum posterior probability criterion as the language of origin 104. This is indicated by block 128 in FIG. 2 and is represented by the language l that satisfies Eq. 1.

In accordance with one embodiment, estimating $P(W|l)$ is performed using a metric indicative of how often the word or named entity 102 is used in any given language. Specifically, one ideal estimate of $P(W|l)$ is to divide the appearance number of word W in language l by the sum of the number of all words used in language l, as set out as follows:

$$P(W \mid l) = \frac{C(W \mid l)}{\sum_i C(W_i \mid l)} \qquad \text{Eq. 2}$$

where C(W|l) is the count of the number of times word W appears in language l in some large text corpus; and C(W$_i$|l) is the count of the number of times the ith word W appears in language l, and that count is summed over all words in language l in the denominator of Eq. 2.

It will be appreciated, of course, that it is very difficult to achieve a reliable estimation of these counts because of a lack of large enough text corpus for many different languages. However, with increasing use of wide area networks, such as the Internet, and the quick increase of web content available, the web presents a very large corpus in many different languages. Therefore, in accordance with one embodiment, the appearance numbers of Eq. 2 of a word or named entity in web pages of different languages is used to determine the language of origin of the word or named entity.

This may not be straight forward, however. In order to detect the language of origin of a word or named entity, generating online search results might appear to be a straight forward process of using the raw appearance numbers of the word or named entity in all languages as a feature. It would seem that a word or named entity is more likely to belong to a language that has the highest number of instances of web pages that use that word or named entity. However, it turns out that this is a rather naive approach and yields results that may be unsatisfactory. This arises from at least two reasons.

First, the contents of the web resource are located in a dynamic system that is constantly changing. Some recent studies have shown that the known Internet is growing by more than approximately 10 million new, static pages each day. Similarly, it is not surprising when a web site with a million pages disappears without notice. At the same time, search engines update databases automatically on a substantially continuous basis. Therefore, the appearance number of a word obtained by queries at different times is normally not constant.

A second reason is that the distribution of the total amount of available contents in different languages is not uniform, nor is it stable. Instead, the distribution of the number of web pages in different languages shows that approximately three-quarters of all web pages are written in the English language. A much smaller percentage are written in Japanese, German, French, Chinese, and other languages. Since the number of English language web pages is much larger than those of French and German pages, for instance, a larger appearance number in English does not necessarily mean a proportionally higher likelihood that a word or named entity originated in English rather than in French or German. For example, the name "Hertzberg" is plainly a German name. However, it has a higher appearance number in English web pages than in German web pages.

Therefore, in accordance with one embodiment, the prior probabilities of candidate languages appearing on the web (or other large data corpus being searched) are considered. Yet, it is even difficult to obtain an exact prior probability of each language. In fact, the prior probability of each language is also dynamic and constantly changing.

Therefore, in order to estimate P(W|l) using Eq. 2, the count C(W|l) for all words used in all languages of interest must be obtained. This, in itself, is difficult. With most current search engines, the information required to obtain C(W|l) is not available. Instead, most search engines only provide the number of pages that a word W appears in, as C(N$_w$|l). Since the word W may appear multiple times in a page, and a page may contain multiple words, $$\frac{C(N_W \mid l)}{\sum_i C(N_{W_i} \mid l)} \qquad \text{Eq. 3}$$

is not a good approximation of P(W|l). Therefore, $$\frac{C(N_W \mid l)}{C(l)} \qquad \text{Eq. 4}$$

can be used instead, where C(l) is the number of pages available for a language 1.

In order to obtain an estimate of C(l) on the fly, one embodiment of the present system uses function words. For instance, most languages have function words such as "the", "a", and "an" in English, and "die", "das", and "der" in German. These function words are almost evenly distributed in all web pages of the associated language. Therefore, the number of pages that contain those function words is roughly proportional to the total number of pages in the language. Hence, C(l) can be approximated by C(N$_{wf}$|l), which represents the appearance number of such a function word, N$_{wf}$, given a language l (i.e., the number of web pages in language l containing the function word N$_{wf}$).

In accordance with yet another embodiment, in order to obtain a more precise function, a list of function words is predefined for each language, of interest, and the entire list of function words, for each language considered, is searched on the fly. The largest page number for any of the given function words in any given language is used as the total number of pages available in that language. It will of course be noted that other metrics could be used as well, such as the average number of web pages containing the function words, a rolling average, etc. Then, P(W|l) is estimated using Eq. 5 as follows:

$$P(W \mid l) \approx \frac{C(N_W \mid l)}{C(N_{w_f} \mid l)} \qquad \text{Eq. 5}$$

Substituting Eq. 5 into Eq. 1 yields:

$$L^* = \underset{l}{\operatorname{argmax}} \left\{ \frac{C(N_W \mid l)}{C(N_{w_f} \mid l)} P(l) \right\} \qquad \text{Eq. 6}$$

Figure 3:
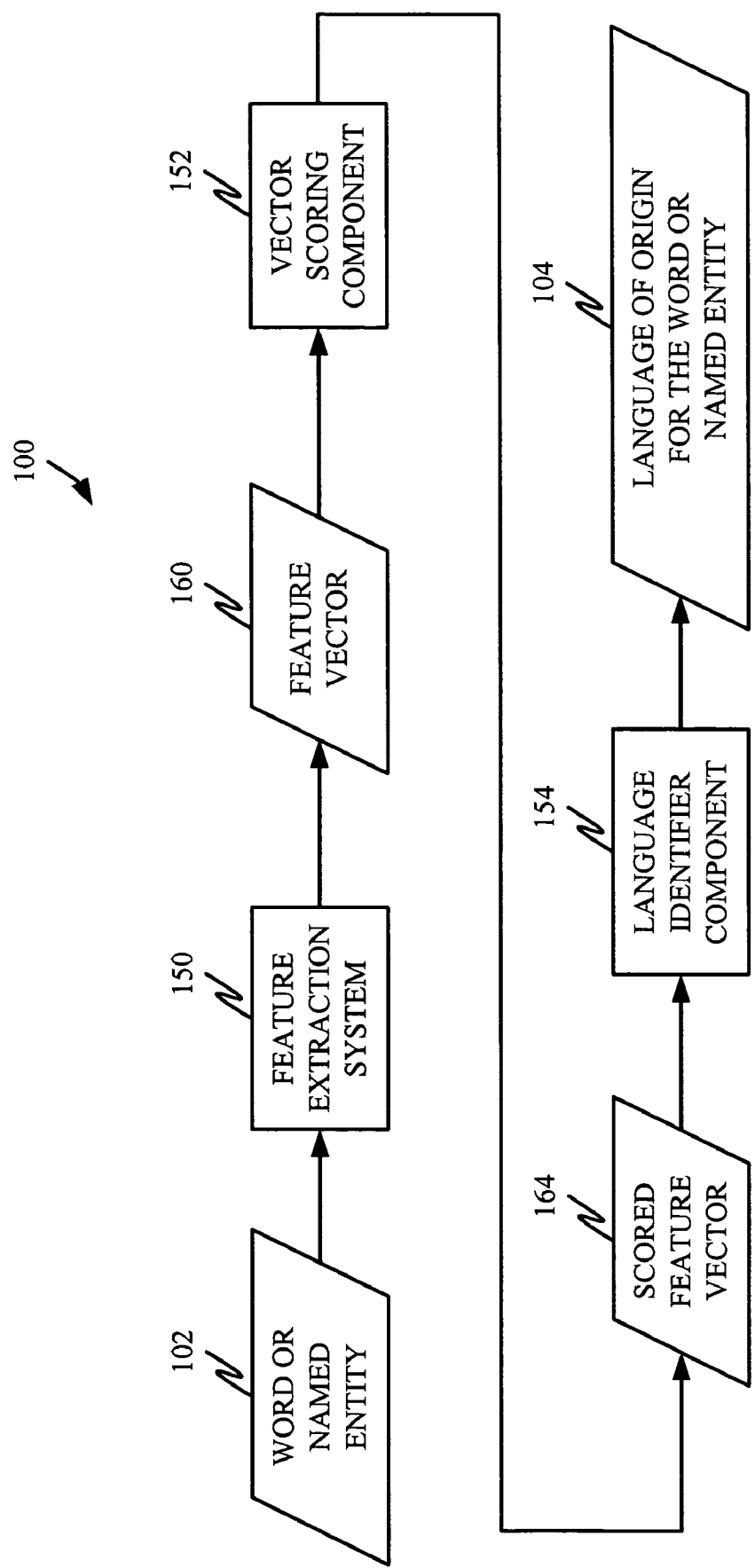
FIG. 3 is a more detailed block diagram of one illustrative language of origin estimation system.
Figure 4:
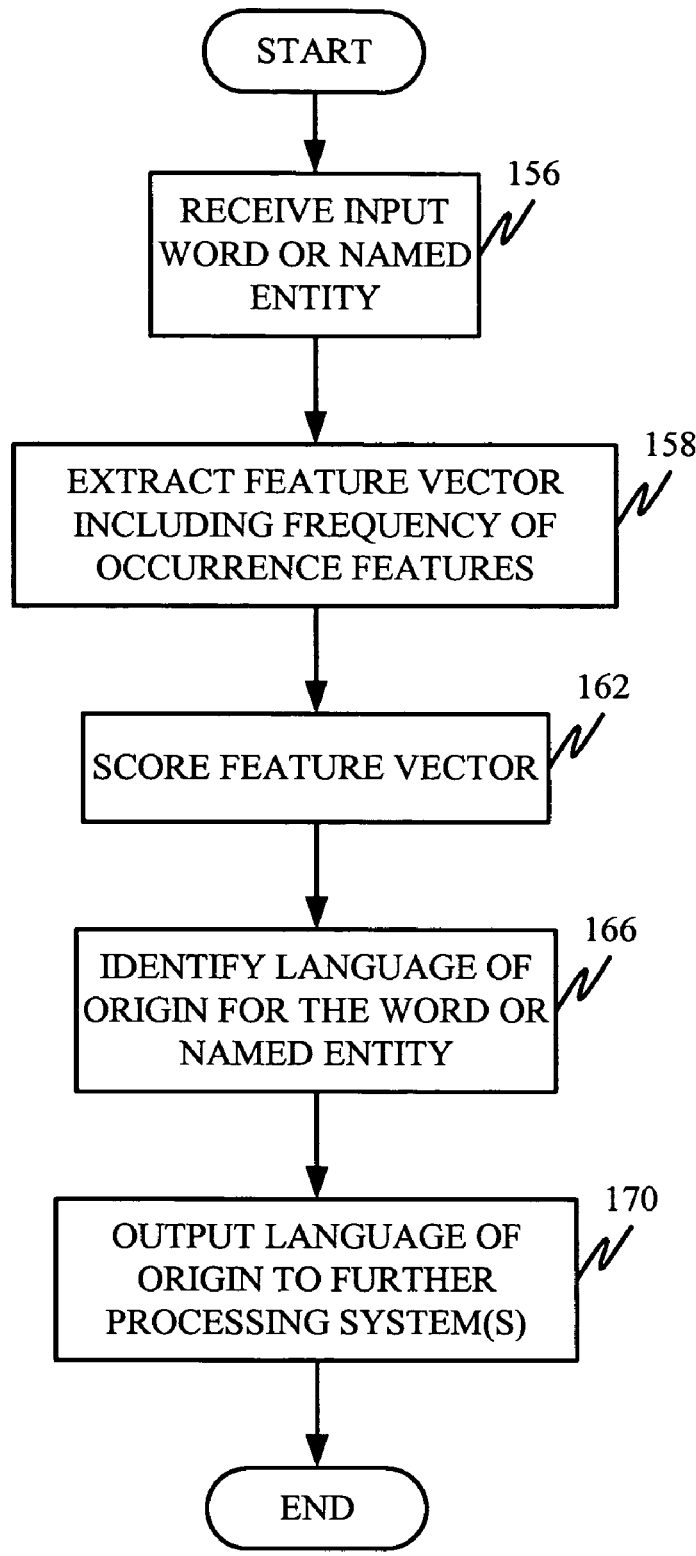
FIG. 4 is a flow diagram illustrating one illustrative embodiment of the operation of the system shown in FIG. 3.

FIG. 3 shows a more detailed block diagram of one illustrative embodiment of language of origin estimation system 100. System 100 shown in FIG. 3 includes feature extraction system 150, vector scoring component 152 and language identifier component 154. FIG. 4 is a flow diagram illustrating one illustrative embodiment of the operation of the system shown in FIG. 3.

The feature extraction system 150 first receives the input word or named entity 102. This is indicated by block 156 in FIG. 4. Feature extraction system 150 then extracts a feature vector that includes the frequency of occurrence features discussed above. This is indicated by block 158 in FIG. 4 and the feature vector is shown by block 160 in FIG. 3. A more detailed discussion of various embodiments of feature extraction system 150 is given below with respect to FIGS. 5-8.

In any case, once feature vector 160 has been generated, it is provided to vector scoring component 152 which scores the feature vector. This is indicated by block 162 in FIG. 4, and the score can be generated in any desired way, such as by weighting individual features, etc. The scored feature vector is shown by block 164 in FIG. 3. The scored feature vector is then provided to language identifier component 154 which identifies the language of origin for the word or named entity 102 based on the scored feature vector 164. This is indicated by block 166 in FIG. 4. In one illustrative embodiment, language identifier component 154 is a classifier that identifies the language of origin by classifying the scored feature vector 164 into a class corresponding to one of a predefined number of languages of origin.

Of course, it will also be noted that system 100 can output the language of origin 104 for the word or named entity 102 to further processing systems, such as a letter-to-sound system, a speech recognition system, a speech synthesis system, etc. This is indicated by block 170 in FIG. 4.

Figure 5:
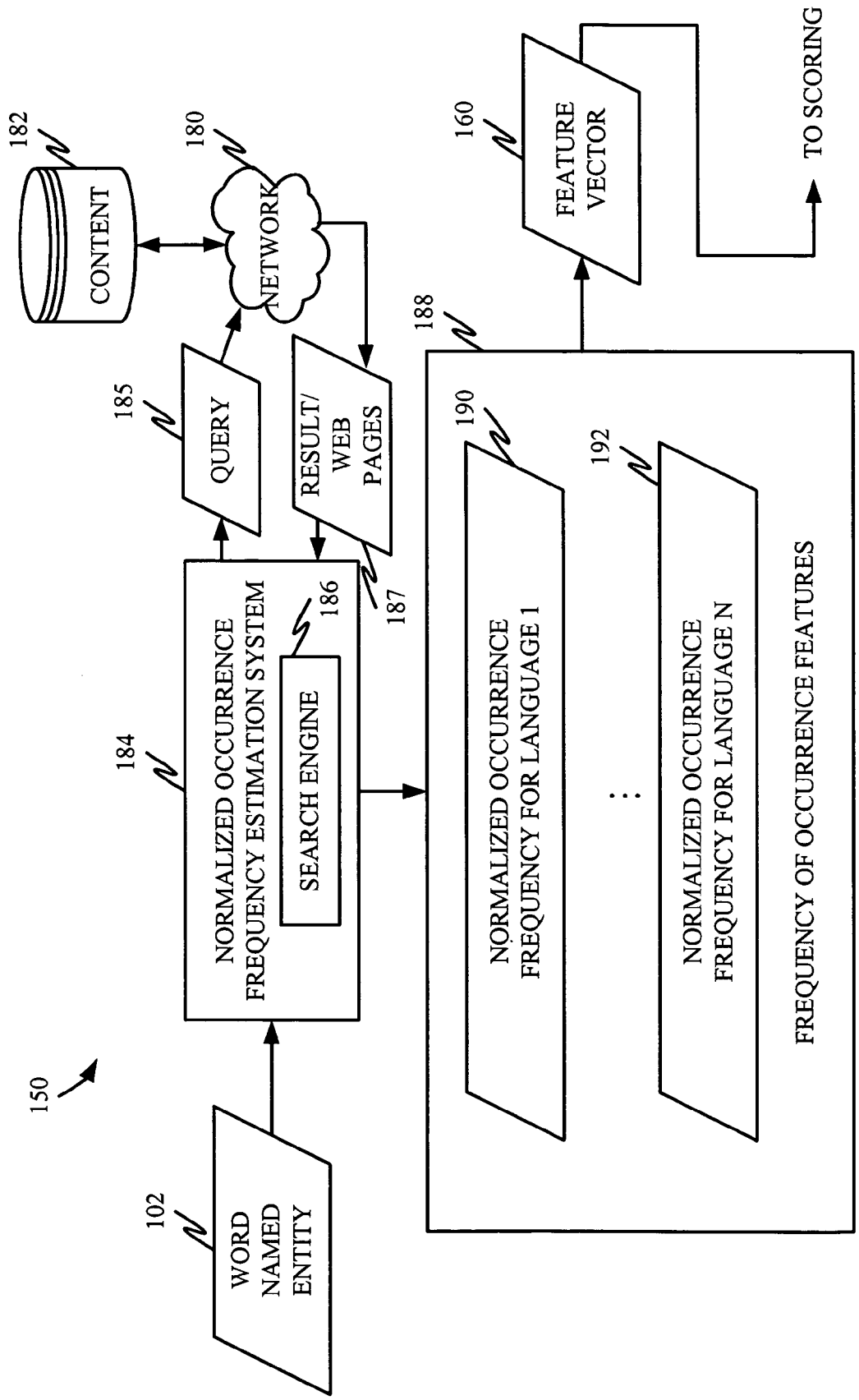
FIG. 5 is a block diagram of one illustrative feature extraction system in more detail.

FIG. 5 is a more detailed block diagram of one illustrative embodiment of feature extraction system 150. Feature extraction system 150 is shown in FIG. 5 receiving the input word or named entity 102 and having access through network 180 to content 182. In one illustrative embodiment, content 182 is web content available through network 180, which can be embodied as the Internet. Of course, other networks 180 and content 182 can be used.

System 150 shown in FIG. 5 also includes normalized occurrence frequency estimation system 184 that includes a search engine 186. It will be noted that search engine 186 can either be incorporated into normalized occurrence frequency estimation system 184 or separate therefrom. It is shown incorporated into system 184, for example only, in FIG. 5.

In any case, normalized occurrence frequency estimation system 184 receives the input word or named entity 102 and launches queries 185 against content 102 through network 180 in order to obtain results such as web pages (or a listing or identity of web pages) 187 to generate frequency of occurrence features 188. In the embodiment shown in FIG. 5, the frequency of occurrence features are the normalized occurrence frequencies for languages 1-n. Therefore, the specific features include the normalized occurrence frequency for language 1 represented by numeral 190 in FIG. 5 and the normalized frequency for language n represented by numeral 192 in FIG. 5. Of course, there will be a normalized occurrence frequency for each input word 102 for each language under consideration. The normalized occurrence frequencies for each of the languages are combined into feature vector 160 which is passed on for scoring as discussed above with respect to FIG. 3.

Figure 6:
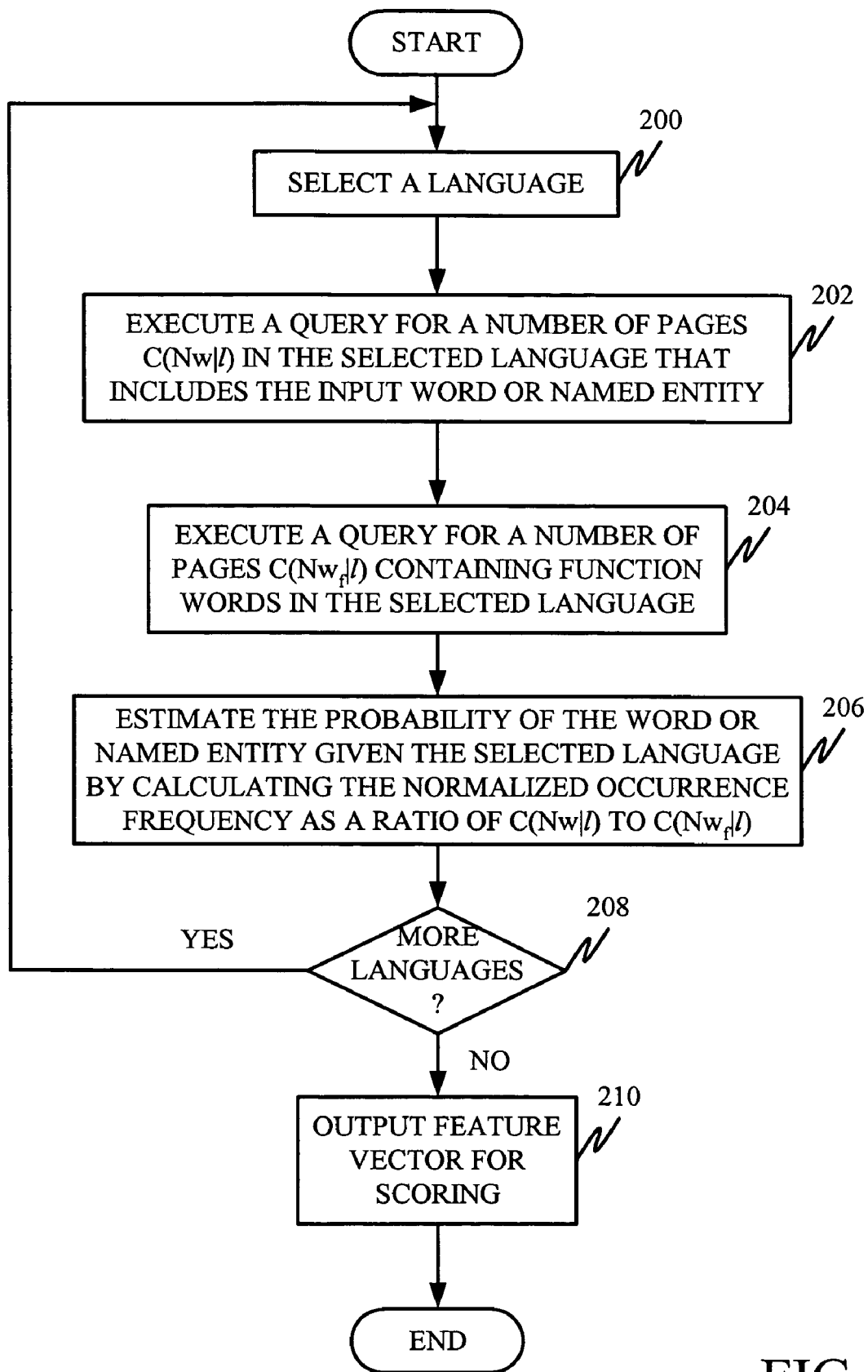
FIG. 6 is a flow diagram illustrating one embodiment of the operation of the system shown in FIG. 5.

FIG. 6 is a flow diagram better illustrating one embodiment of the operation of feature extraction system 150 shown in FIG. 5 in extracting features. Feature extraction feature 150 first selects a language l for consideration. This is indicated by block 200 in FIG. 6. Normalized occurrence frequency estimation system 184 then executes a query through search engine 186 for a number of pages $C(N_w|l)$ in the selected language l that include the input word or named entity 102. This is indicated by block 202 in FIG. 6.

System 184 then executes another query through search engine 186 for a number of pages $C(N_{wf}|l)$ containing one or more predefined function words in the selected language. This is indicated by block 204 in FIG. 6.

Normalized occurrence frequency estimation system 184 then estimates the probability of the word or named entity 102 given the selected language l by calculating a normalized occurrence frequency as a ratio of $C(N_w|l)$ to $C(N_{wf}|l)$ as indicated by Eq. 5 above. This is indicated by block 206 in FIG. 6.

System 184 then determines whether there are more languages to consider. If so, processing reverts to block 200 where another language is selected. If not, however, then all languages have been considered for the input word or named entity 102 and all features have been calculated for that word or named entity. Thus, the feature vector including the features which have just been calculated are output for scoring. Determining whether there are additional languages to consider and outputting the feature vector for scoring is indicated by blocks 208 and 210, respectively, in FIG. 6.

It will be appreciated that the normalized occurrence frequency discussed above is an approximation of P(W|l) and it reflects how often a name is used in a given language. However, a name that appears on a content page (such as a web page) written in one language may not belong to that language. For example, famous persons such as scientists, movie stars, sports figures, etc. may very often appear in pages of a large variety of different languages. Therefore, analyzing morphology of a word or named entity may be helpful in identifying a language of origin.

In accordance with one embodiment, the morphological characteristics of a language are extracted by n-gram models of letters or letter chunks from named entities used in that given language. The likelihood for a word W with letter sequence $[s_1, s_2, \ldots, S_n]$ originating in language l, can be calculated as follows:

$$P(W \mid l), \quad \text{Eq. 7}$$

$$P(W \mid l) = P(s_1, s_2, \ldots, s_t \mid l)$$
$$= P(s_1 \mid l) P(s_2 \mid s_1, l) \ldots P(s_{t-1}, s_{t-2}, \ldots, s_1, l)$$

If letter n-gram models are used, and the appearance of a letter is assumed to depend only on the n-1 preceding letters, then Eq. 7 can be written as follows:

$$P(W \mid l) \approx P(s_1 \mid l) P(s_2 \mid s_1, l) \ldots \prod_{i=N}^{t} P(s_i \mid s_{i-1}, \ldots, s_{i-N+1}, l) \quad \text{Eq. 8}$$

The n-gram likelihood is relatively precise when the value of n is close to the length of a word. However, because of the data sparseness problem it is difficult to accurately estimate models with large values of n. Therefore, scores from multiple letter chunk n-grams can be combined to reduce error rates.

Figure 7:
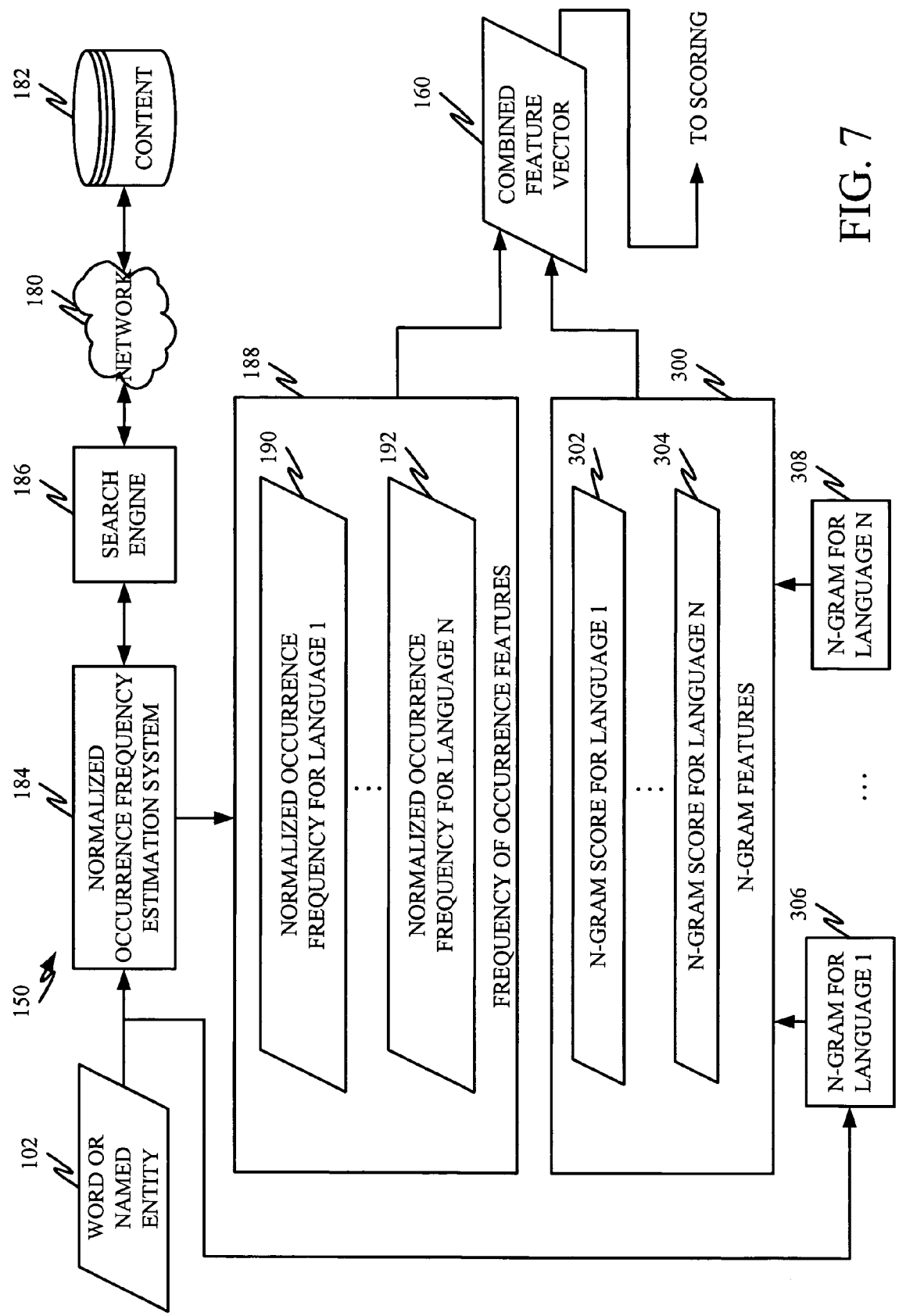
FIG. 7 is a block diagram of another embodiment of a feature extraction system in more detail.

FIG. 7 shows one illustrative embodiment of feature extractor 150 which not only includes the frequency of occurrence features 188 described above with respect to FIG. 5, but which also include n-gram features 300. N-gram features 300 include an n-gram score for language 1, designated by numeral 302 in FIG. 7 and an n-gram score for language n designated by numeral 304. The n-gram scores are calculated from n-grams 306 and 308, respectively.

It can be seen from the embodiment in FIG. 7 that there is illustratively an n-gram for each language under consideration, and each input word or named entity 102 is subjected to each n-gram to obtain an n-gram score for each language. Those scores 302 and 304 are the n-gram features 300.

It can be seen in the embodiment shown in FIG. 7 that features 188 and 300 are parallel, and are combined to form combined feature vector 160. The combined feature vector 160 is illustratively provided to vector scoring component where it is scored and then to language identifier component 154 (in FIG. 3) where it is used to identify the language of origin.

In one embodiment, language identifier component 154 is illustratively a classifier for combined features. The classifier is described in greater detail below.

Figure 8:
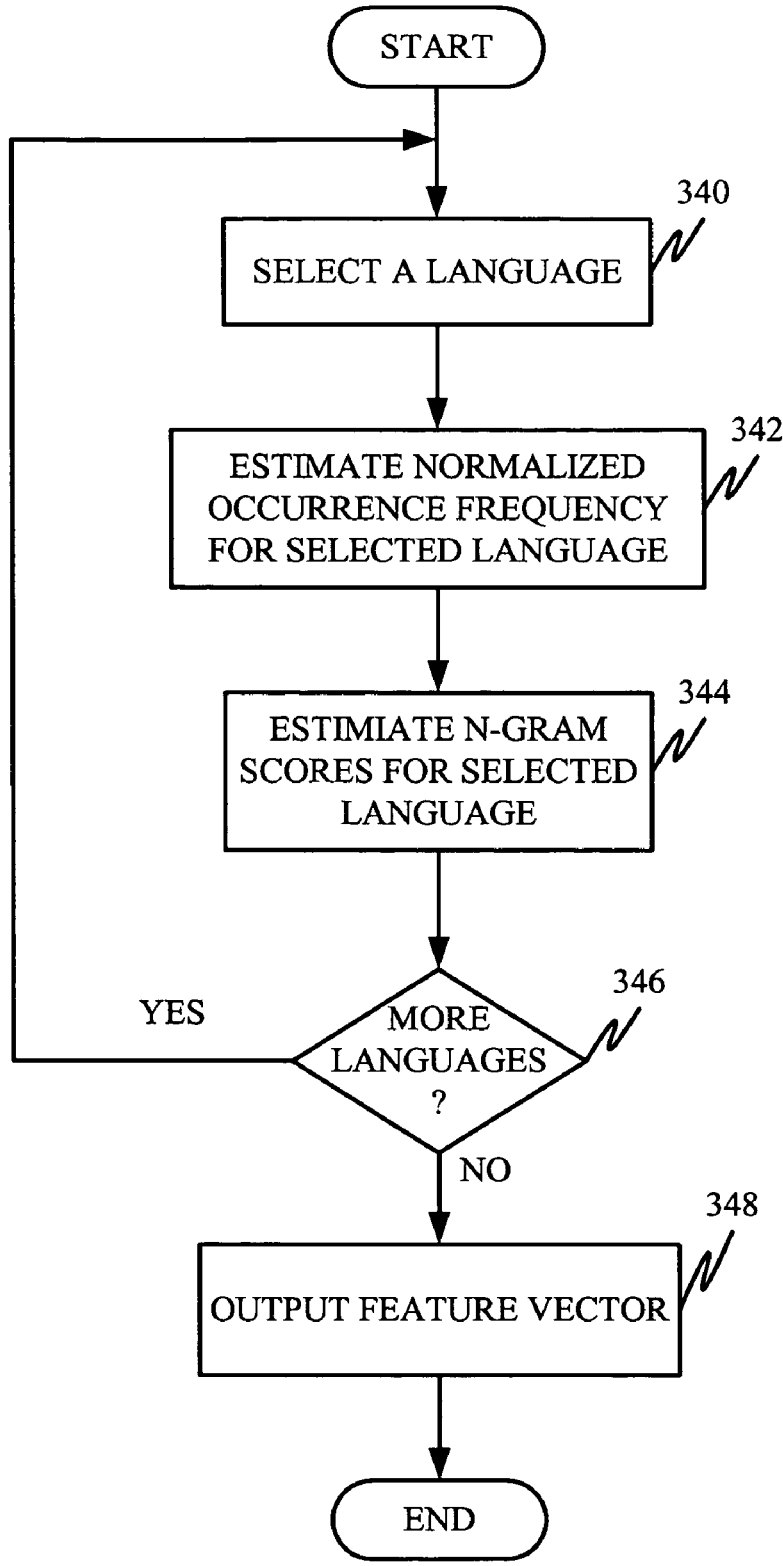
FIG. 8 is a flow diagram illustrating one illustrative embodiment of the operation of the system shown in FIG. 7.

FIG. 8 shows one illustrative flow diagram of the operation of the system shown in FIG. 7. First, a language l is selected. This is indicated by block 340 in FIG. 8. Next, normalized occurrence frequency estimation system 184 estimates the normalized occurrence frequency values for the selected language given the input word or named entity. This is indicated by block 342 in FIG. 8.

The n-grams 306 and 308 are then used to estimate the n-gram scores 302 and 304 for the selected language. This is indicated by block 344 in FIG. 8. System 150 then determines whether there are any additional languages to consider. This is indicated by block 346. If so, processing reverts to block 340 where another language is selected. However, if all languages have been considered, then the combined feature vector 160 is output by system 150. This is indicated by block 348 in FIG. 8.

In one embodiment, the classifier used to identify the language of origin based on the feature vector or combined feature vector is implemented using adaptive boosting techniques. These techniques are commonly referred to as AdaBoost. The AdaBoost techniques are well studied mechanisms for finding a highly accurate hypothesis by combining many weak classifiers. The original AdaBoost algorithm is designed for handling a two-class classification problem. In the present task, it is a multi-class problem and the AdaBoost algorithm is therefore extended error correcting code and is referred to as AdaBoost.ECC. Generally, for each class, an error correcting code can be designed. Each bit in the code represents a two-class problem. For an L class problem, the error correcting code can be used to convert it into Q 2-class problems. For instance, for a sample x in class C, there are Q two-class classifiers. The output of the Q classifier can be a feature vector $f_i(x) \ldots, f_q(x)$ The posterior probability of class C is:

$$p(C/x) = \prod_{i=1}^{Q} p(c_i/x)$$

$$= \prod_{i=1}^{Q} \frac{\exp(c_i \cdot f_i(x))}{\exp(f_i(x)) + \exp(-f_i(x))}$$

Eq. 9

Using Eq. 9, when a word or named entity is received, it is recognized by the Q classifiers that make up language identifier component 154. The posterior probability of each language is calculated by Eq. 9. The hypothesis with the highest posterior probability will be the final output language of origin for the word or named entity 104.

Figure 9:
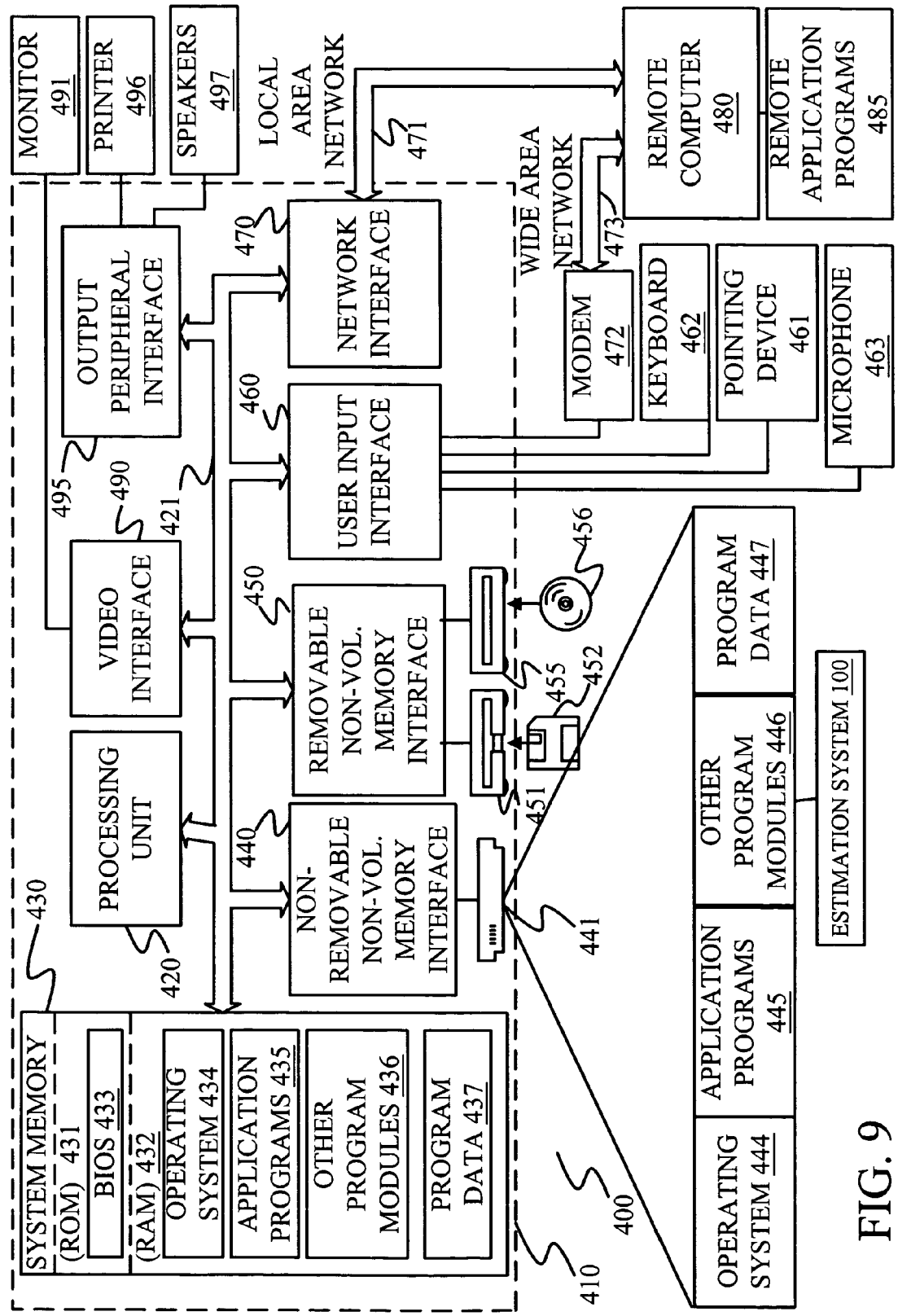
FIG. 9 is a block diagram of one illustrative computing environment.

FIG. 9 illustrates an example of a suitable computing system environment 400 on which embodiments may be implemented. The computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 9, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 132 typically contains data and/or program modules that are immediately accessible to and/or presently being operated on by processing unit 420. By way of example, and not limitation, FIG. 9 illustrates operating system 134, application programs 435, other program modules 136, and program data 437. System 100 is shown as one of program modules 436, but it could be located elsewhere as well.

The computer 410 may also include other removable/non-removable volatile/nonvolatile computer storage media. By way of example only, FIG. 9 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 9, provide storage of computer readable instructions, data structures, program modules and other data for the computer 410. In FIG. 9, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 9 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The searches discussed above can be carried out over either LAN 471 or WAN 473, for instance. The modem 472, which may be internal or external, may be connected to the system bus 121 via the user input interface 460, or other appropriate mechanism. In a networked environment, program modules depicted relative to the computer 410, or portions thereof, may be stored in the remote memory storage device. By way of example, and not limitation, FIG. 9 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of identifying a language of origin of an input word, using a computer with a processor, comprising:
  generating a wide area network query based on the input word to obtain, with the processor, search results, comprising web pages, in a plurality of different languages;
  estimating, with the processor, a normalized frequency of occurrence of the input word in each of the different languages based on the search results;
  identifying, with the processor, the language of origin of the input word based on the estimated frequencies of occurrence, and
  outputting an indication of the language of origin;
  wherein the search results comprise web pages and wherein estimating a normalized frequency of occurrence in a selected language comprises:
    obtaining a count of a number of web pages in the selected language in the search results that contain the input word; and
    estimating a total number of web pages in the selected language by generating a wide area network query based on one or more function words in the selected language to obtain function word search results, and estimating the total number of web pages based on the function word search result.

2. The method of claim 1 wherein identifying the language of origin comprises:
- generating a feature vector indicative of the frequencies of occurrence of the input word, in the different languages; and
- identifying the language of origin based on the feature vector.

3. The method of claim 1 wherein estimating a normalized frequency of occurrence in the selected language comprises:
- estimating the normalized frequency of occurrence as a ratio of the count of the number of web pages that contain the input word to the total number of web pages.

4. The method of claim 1 wherein the function word search results comprise an indication of web pages containing the one or more function words and wherein estimating the total number of web pages based on the function word search result, comprises:
- estimating the total number of web pages in the selected language as a number of web pages that contain one of the function words.

5. The method of claim 1 wherein generating a wide area network query based on the one or more function words comprises:
- obtaining a predefined set of a plurality of function words; and
- generating the query using the predefined set of function words.

6. The method of claim 1 and further comprising:
- generating an indication of how likely the input word is to have a given language of origin based on a morphological structure of the input word.

7. The method of claim 2 wherein generating the feature vector comprises:
- generating morphological structure features indicative of n-gram scores for the input word given each of the different languages; and
- generating the feature vector to indicate the morphological structure features.

8. A system for identifying a language of origin of an input word, comprising:
- a feature extraction system comprising a frequency of occurrence estimation system estimating a frequency of occurrence of the input word in each of a plurality of different languages;
- a language identifier identifying the language of origin of the input word based on the frequency of occurrence estimated;
- a search engine coupled to the feature extraction system, the feature extraction system generating a wide area network query based on one or more function words in a selected language to obtain function word search results and extracting features from the function word search results, the features being indicative of the frequency of occurrence of the input word;
- the feature extraction system extracting normalized frequency of occurrence features based on a number of pages in the function word search results, in the selected language, that contain the one or more function words and an estimate of a total number of pages in the language; and
- a computer processor, activated by the frequency of occurrence estimation system, to facilitate estimating the frequency of occurrence.

9. The system of claim 8 wherein the feature extraction component includes:
- a morphological feature extractor configured to extract morphological features indicative of how likely the input word has a given language of origin based on a morphological structure of the input word.

10. The system of claim 9 wherein the morphological feature extractor is configured to extract n-gram scores for the input word in each language.

11. The system of claim 10 wherein the language identifier comprises a classifier.

* * * * *